US012490900B2

(12) United States Patent
Chlasta

(10) Patent No.: US 12,490,900 B2
(45) Date of Patent: Dec. 9, 2025

(54) MEASURING DEVICE INTENDED TO BE PLACED IN CONTACT WITH A TISSUE AND METHOD FOR ANALYZING THE MEASURED TISSUE DATA

(71) Applicant: BIOMECA, Lyons (FR)

(72) Inventor: Julien Chlasta, Sainte Foy les Lyon (FR)

(73) Assignee: BIOMECA, Lyons (FR)

( * ) Notice: Subject to any disclaimer, the term of this patent is extended or adjusted under 35 U.S.C. 154(b) by 538 days.

(21) Appl. No.: 17/801,136

(22) PCT Filed: Feb. 18, 2021

(86) PCT No.: PCT/FR2021/050296
§ 371 (c)(1),
(2) Date: Aug. 19, 2022

(87) PCT Pub. No.: WO2021/165624
PCT Pub. Date: Aug. 26, 2021

(65) Prior Publication Data
US 2023/0082846 A1    Mar. 16, 2023

(30) Foreign Application Priority Data

Feb. 20, 2020    (FR) ..................... 20/01710

(51) Int. Cl.
*A61B 5/00*    (2006.01)
*G01N 3/42*    (2006.01)

(52) U.S. Cl.
CPC .......... *A61B 5/0053* (2013.01); *A61B 5/0057* (2013.01); *G01N 3/42* (2013.01)

(58) Field of Classification Search
CPC ...... A61B 5/0048; A61B 5/0053; G01N 3/40; G01N 3/42
See application file for complete search history.

(56) References Cited

U.S. PATENT DOCUMENTS 8,425,433 B2 *   4/2013   Dunn ..................... A61B 5/442
                                                                600/587
2013/0291658 A1   11/2013  Pailler-Mattei et al.
(Continued)

OTHER PUBLICATIONS

International Search Report; European Application No. 21 711 298.6; Date of mailing: Oct. 23, 2024; 7 pages.
(Continued)

*Primary Examiner* — Erika J. Villaluna
(74) *Attorney, Agent, or Firm* — CANTOR COLBURN LLP

(57) ABSTRACT

A measuring device intended for being placed in contact with a tissue and a method for analysing the measured tissue data. A measuring device intended for being placed in contact with a tissue, and including an indenter configured to cause a deformation of the tissue, a strain gauge configured to measure a force of resistance of the tissue to the deformation caused by the indenter; and a position sensor configured to measure an indentation depth representative of a movement of the indenter. A method for analysing tissue data relating to a tissue, the method being implemented by computer and including a step of associating a measurement of the indentation depth and a measurement of the force of resistance to the deformation corresponding to the indentation depth.

18 Claims, 5 Drawing Sheets

(56) References Cited

U.S. PATENT DOCUMENTS

2014/0020475 A1* 1/2014 Inoue .................. A61B 5/0053
                                                          73/788
2017/0061621 A1* 3/2017 Wortman ............. G06T 7/0016
2017/0231499 A1   8/2017 Gimzewski et al.
2019/0029592 A1   1/2019 Yao et al.

OTHER PUBLICATIONS

International Search Report for International Application No. PCT/FR2021/050296; Date of Completion: Jun. 1, 2021; Date of Mailing: Jun. 9, 2021; 4 Pages.
Translation of International Search Report for International Application No. PCT/FR2021/050296; Date of Completion: Jun. 1, 2021; Date of Mailing: Jun. 9, 2021; 2 Pages.
Written Opinion for International Application No. PCT/FR2021/050296; Date of Mailing: Jun. 9, 2021; 5 Pages.

* cited by examiner

[Fig. 1]
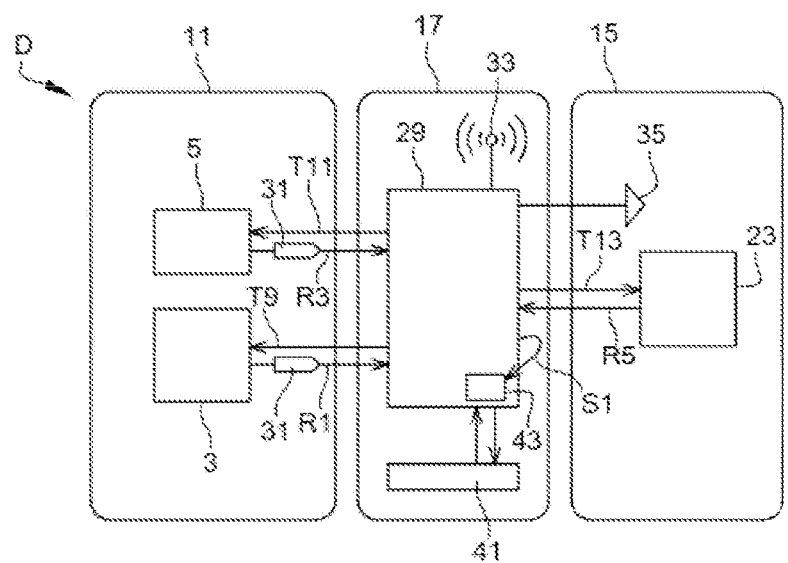
[Fig. 2]
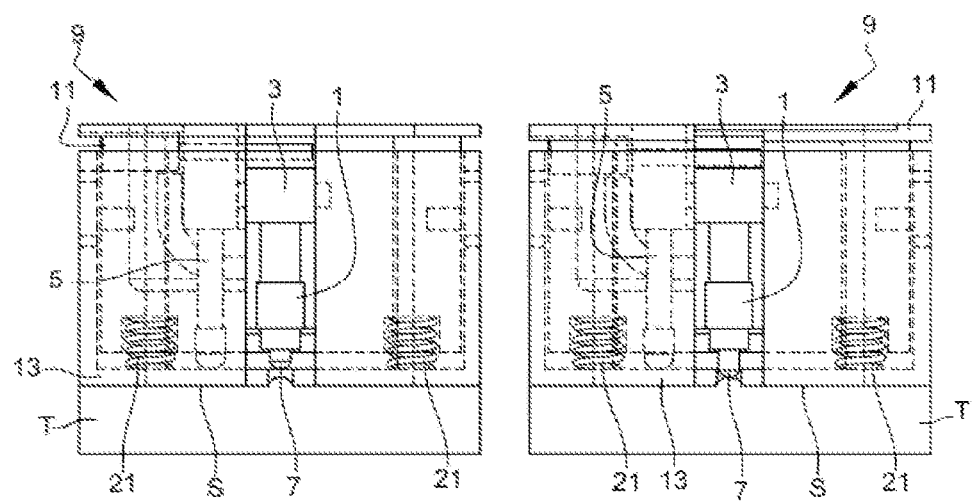

[Fig. 3]
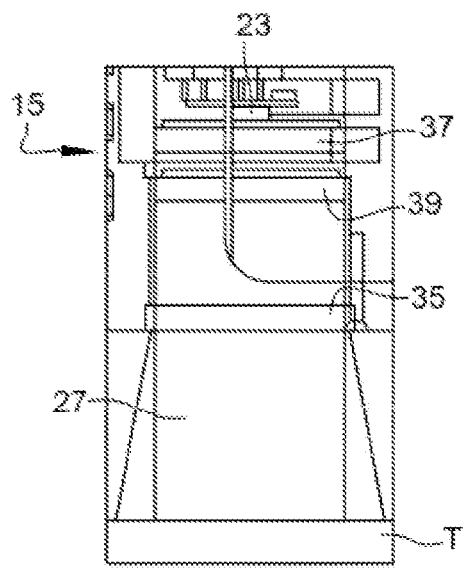
[Fig. 4]
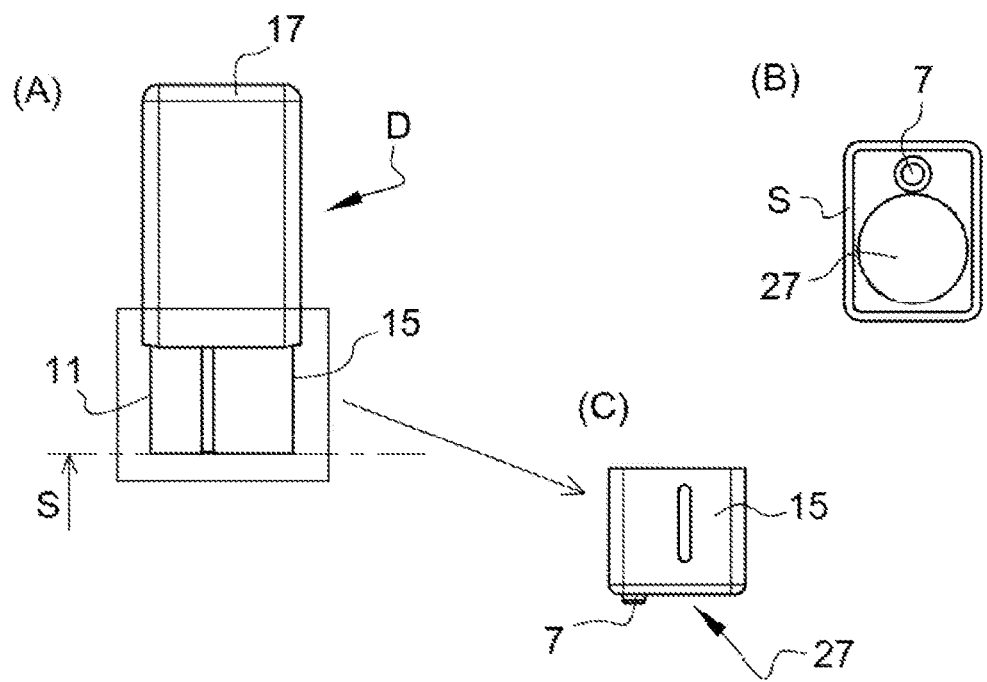

[Fig. 5]
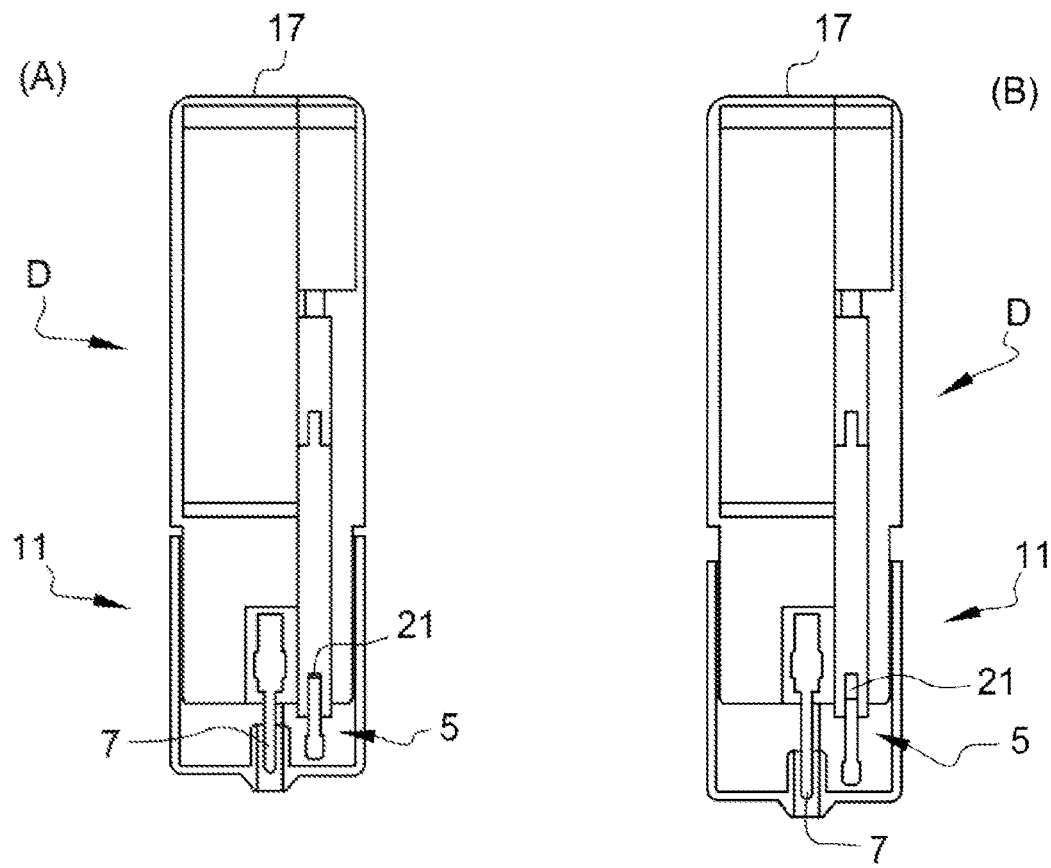
[Fig. 6]
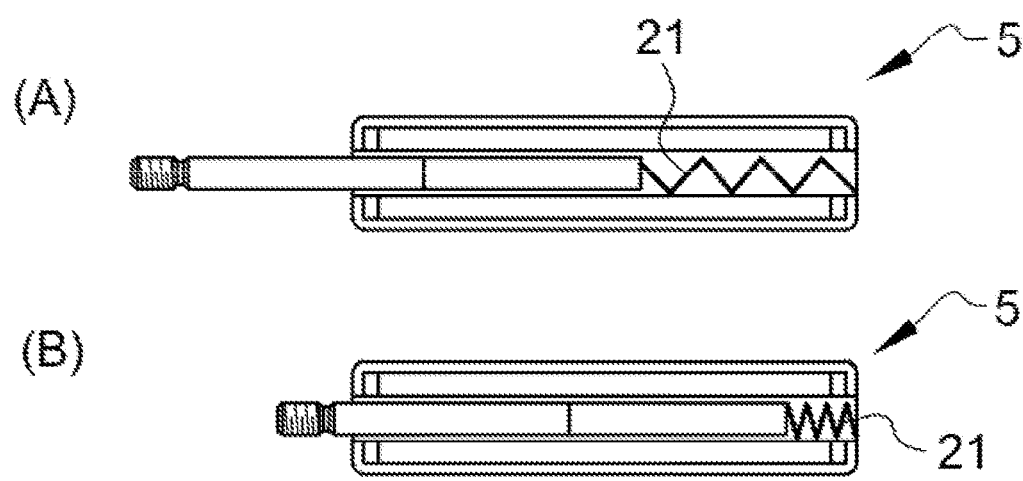

[Fig. 7]
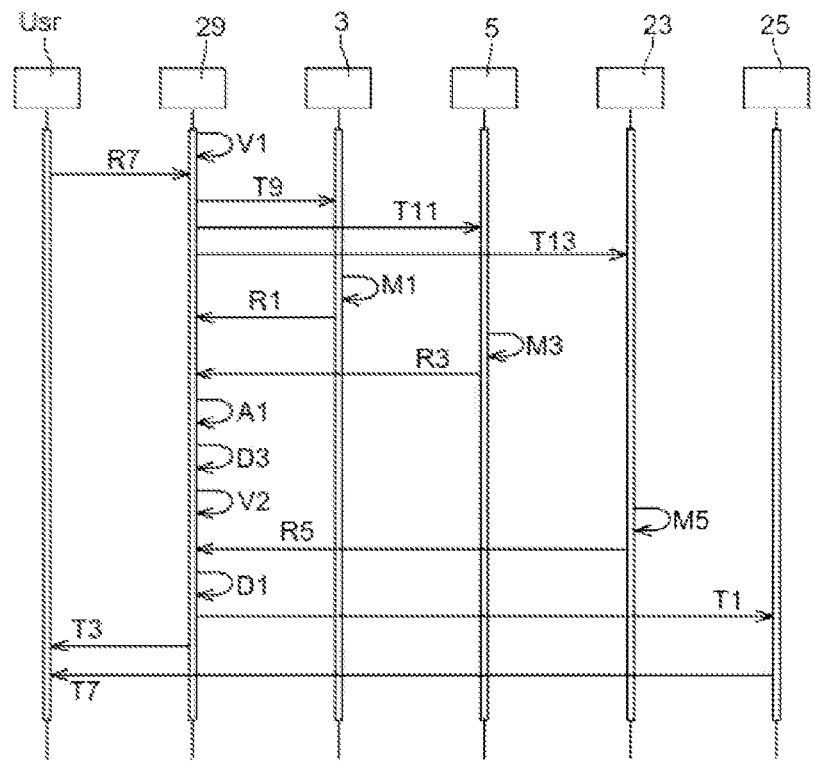
[Fig. 8]
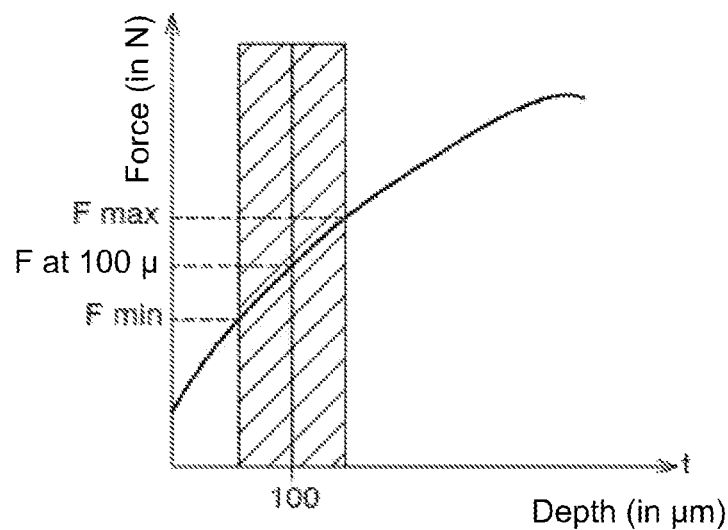

[Fig. 9]
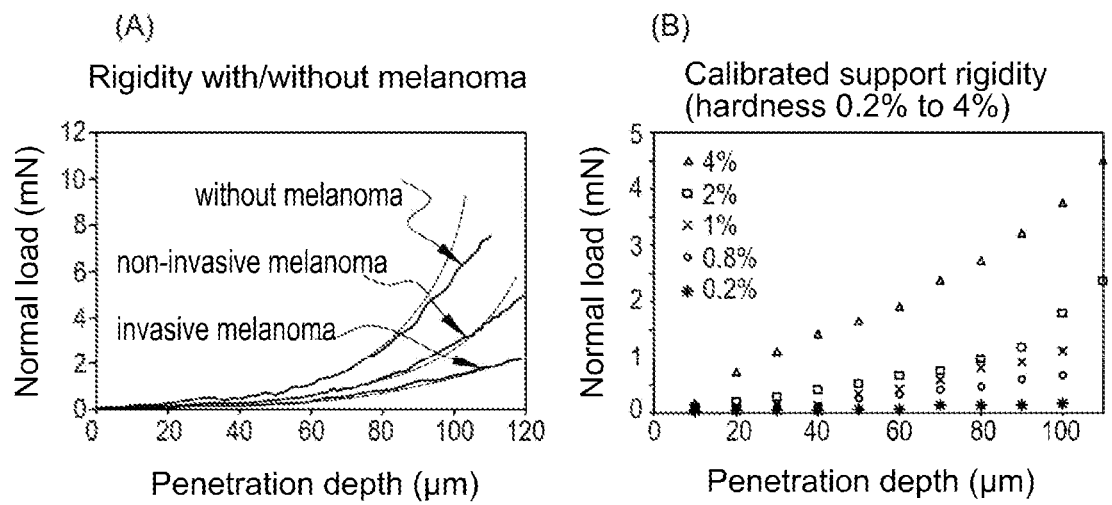
[Fig. 10]
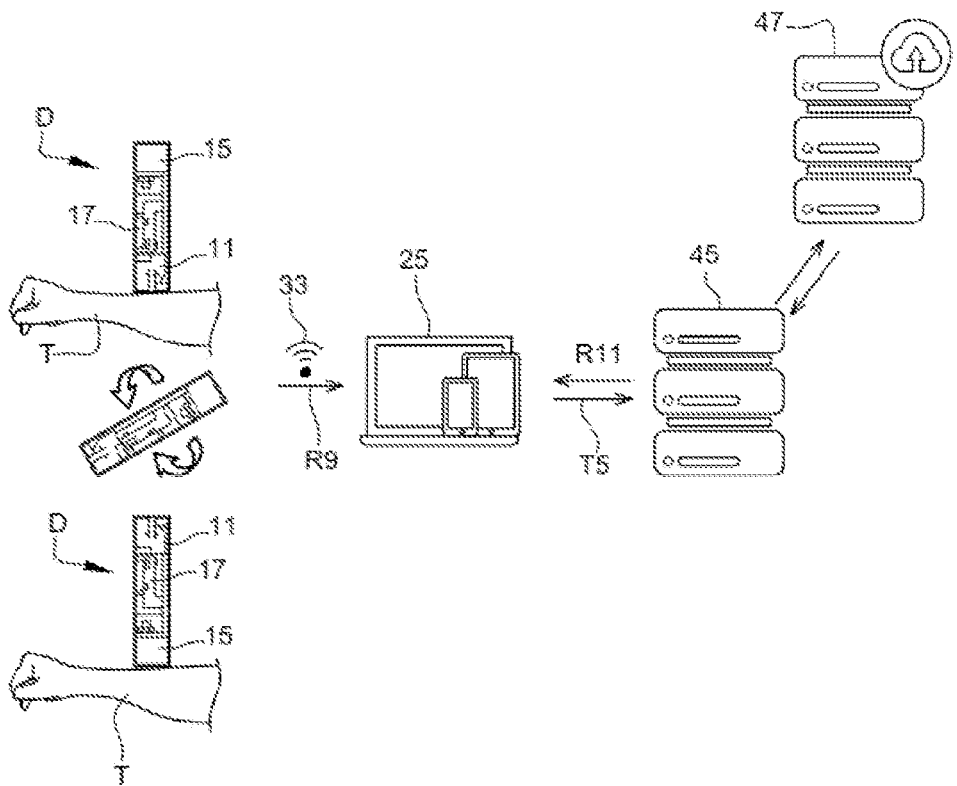

MEASURING DEVICE INTENDED TO BE PLACED IN CONTACT WITH A TISSUE AND METHOD FOR ANALYZING THE MEASURED TISSUE DATA

CROSS REFERENCE TO RELATED APPLICATIONS

This application is a National Stage of PCT Application No. PCT/FR2021/050296 filed on Feb. 18, 2021, which claims priority to French Patent Application No. 20/01710 filed on Feb. 20, 2020, the contents each of which are incorporated herein by reference thereto.

TECHNICAL FIELD

The present disclosure relates to a measuring device intended to be placed in contact with a tissue.

The present disclosure also relates to a method for analyzing tissue data.

BACKGROUND

In the field of biological tissues analysis, analysis methods are numerous and generally depend on the tissues to be analyzed. In the case of the skin, a method generally used for suspected cancerous lesions is a visual analysis by a practitioner. This analysis method is based on the ABCDE rule, which enables the practitioner to assess the condition of a skin lesion according to morphological criteria such as asymmetry, edge regularity, color, diameter and thickness. Sometimes, this method is supported by dermoscopy.

However, it is noticed in most cases that the experience and training of the practitioner considerably increases the performance of the analysis of data from biological tissues. The sensitivity and specificity of these methods are quite good when the practitioner has a good knowledge of the semiology of skin lesions, which is generally not the case with general practitioners or inexperienced medical specialists.

Moreover, despite the experience of the practitioner, the analysis of data derived from biological tissues could be altered by the nature of the analyzed skin. Indeed, human skin is composed of three layers: the epidermis, the dermis and the hypodermis. The epidermis is the most superficial layer and is subdivided into several other layers with their own biomechanical characteristics. The stratum corneum is the outermost layer, it is that one that peels off, and is "visible" to the eye. This layer is very rigid, it allows, inter alia, protecting the human body from external aggressions (chemical, Sun, etc.). Its properties are dependent on each individual, which is why the biomechanical values of a "young" skin are different from those of an aged skin. In general, an aged skin is "rigid" (hard) in comparison with a young skin which is "flexible" (soft).

Equipment using more advanced technologies requiring optical scanners or impedance measurement is known from the state of the art. The methods using this equipment are also based on morphological and organizational data with lesion criteria at the cellular level.

Nonetheless, their sensitivity and their specificity are limited by the size of the lesion and its location. These technologies are not easy to use and require training and experience in data interpretation.

A new generation of connected tools also exists, such as "digital dermoscopy" connected by a smartphone application. Patients can scan their skin with zooming and reference photos are available for comparison. This type of tool enables patients to track suspicious lesions, but these lesions are not always dangerous. These tools primarily have an analysis function based on clinical criteria, which allow detecting only advanced melanomas.

BRIEF SUMMARY

The present disclosure aims to propose a solution that addresses one or more of the above-mentioned problems.

This object can be achieved thanks to the implementation of a measuring device intended to be placed in contact with a tissue, the measuring device comprising:
- a support surface intended to be positioned in contact with the tissue;
- an indenter configured to cause a deformation of the tissue, the indenter being configured to be displaceable relative to the support surface between an original position and an indentation position in which the tissue is deformed by the indenter;
- a strain gauge configured to measure a force of resistance of the tissue to the deformation caused by the indenter;
- a position sensor configured to measure an indentation depth representative of a displacement of the indenter between the original position and the indentation position.

The previously-described arrangements allow measuring the biological characteristics of the tissue and in particular the rigidity of the tissue which could be characteristic of at least one tissue lesion if it is present at the level of the measurement area.

The measuring device may further have one or more of the following features, considered alone or in combination.

According to one embodiment, the tissue is a biological tissue and more particularly a skin.

According to one embodiment, the position sensor comprises a linear position sensor.

According to one embodiment, the strain gauge has a nominal capacity of ±0.5 N. The electric power supply is done at a voltage of 5V.

In general, the strain gauge is configured to convert a force measurement into an output voltage related to the completed force measurement.

According to one embodiment, the original position corresponds to the position of the indenter when it comes into contact with the tissue.

According to one embodiment, bringing the indenter into contact with the tissue is detected when the strain gauge registers a stress value greater than a threshold value, for example 0.01 mN. In this manner, it is possible to detect the original position automatically by detecting a stress value. This original position could then serve as an original point allowing performing a superposition between a theoretical control curve with a measured actual curve, which associates a set of measurements of force of resistance to the deformation of the tissue with a set of indentation depth measurements. Thus, the greater the match between the measured curve and the control curve, the more reliable the result of the analysis will be.

According to one embodiment, the indenter comprises a distal end having a shape adapted to enable a deformation of the tissue substantially perpendicular to the surface of said tissue opposite the support surface.

According to one embodiment, the measurement of the force of resistance to the tissue deformation is stopped mechanically when the distal end of the indenter exceeds an indentation depth of 100 µm. For example, the measurement of the force of resistance to the tissue deformation may be stopped when the position sensor measures a displacement of 100 μm from the original position, said original position could correspond to the time point when the strain gauge records a stress value greater than a threshold value.

According to one embodiment, the measurement of the force of resistance to the deformation of the tissue may be stopped when the first portion abuts against the second portion, or at the end of a predetermined measurement time, or else when the measurement has stabilized.

According to one embodiment, the strain gauge is configured to measure the force of resistance to the deformation of the tissue according to a measurement axis, and wherein the indentation depth is measured according to the measurement axis, said measurement axis being substantially perpendicular to the support surface.

By substantially perpendicular, it should be understood a direction of the measurement axis comprised within an angular interval from 0° to 5° with respect to the direction normal to the tissue.

According to one embodiment, the position sensor comprises an inductive sensor.

According to one embodiment, the position sensor may have a 4 μm step over a range of 2 mm.

According to one embodiment, the measuring device comprises a case comprising:
 a first portion on which the indenter bears;
 a second portion having the support surface and being connected to the first portion via at least one return element.

The previously-described arrangements allow stabilizing the device on the tissue before the measurement is taken by a user.

According to one embodiment, the return element comprises at least one spring.

According to one embodiment, the measuring device comprises a camera configured to collect an image of the tissue representative of the tissue, the measuring device being configured to communicate the image of the tissue, the force of resistance to the deformation of the tissue and the indentation depth to a user terminal.

According to one embodiment, the case comprises a third portion defining an opening, said opening being configured to delimit an area of interest representative of an area at the surface of the tissue from which the image of the tissue is collected.

According to one embodiment, the opening is included in a dark chamber formed in the case, said dark chamber being configured to delimit a volume protected from external light in which the image of the tissue is collected. In this manner, the collection of an image of the tissue by the camera is reproducible and standardized.

According to one embodiment, the strain gauge is configured to measure a plurality of forces of resistance to the deformation of the tissue at a point of interest included in the area of interest, depending on the indentation depth.

According to one embodiment, the case comprises a fourth portion secured to the second portion on the one hand and to the third portion on the other hand and configured to enable gripping of the measuring device by one hand.

In this manner, the fourth portion could be used as a grip to handle the measuring device.

According to one embodiment, the measuring device comprises a processor configured to communicate with the position sensor, the strain gauge and the camera via a converter element.

According to one embodiment, the processor could communicate with the user terminal via an antenna.

According to one embodiment, the processor could communicate with the user terminal by wired connection.

According to one embodiment, the converter element comprises an analog-to-digital converter. For example, said analog-to-digital converter may be configured to operate at 24 bits.

In general, the converter element may be configured to convert an electrical voltage into a digital signal.

According to one embodiment, the processor comprises a microcontroller configured to monitor the position sensor and the strain gauge in real-time.

According to one embodiment, the microcontroller, the position sensor and the strain gauge are contained in a volume smaller than 10,050 $mm^3$. In this manner, the measurement signals measured by the strain gauge and by the position sensor are more stable, which allows guaranteeing a more reliable measurement. Moreover, the described arrangements allow limiting the overall bulk and providing a more ergonomic measuring device.

According to one embodiment, the converter element is configured to convert a plurality of forces of resistance to the deformation of the tissue into a first signal, and to convert a plurality of indentation depths into a second signal, the processor being configured to determine, from the first signal and the second signal, a target value of the force of resistance to the deformation of the tissue corresponding to a predetermined indentation depth.

According to one embodiment, the processor is configured to communicate the target value, and the image of the tissue to the user terminal.

According to one variant, the target value and the image of the tissue could be analyzed in order to characterize a tissue lesion, for example according to a predetermined algorithm.

According to one embodiment, the analysis may be carried out through an artificial intelligence processing using an engine trained with test data corresponding to known cases. It is also possible to use a decision tree.

According to one embodiment, the predetermined indentation depth is comprised between 90 μm and 110 μm and more particularly substantially equal to 100 μm.

The previously-described arrangements allow differentiating different types of skin lesions. For this measurement to be reliable, it is particularly essential to be able to guarantee that the measuring device establishes a measurement at 100 μm of indentation counted from the contact with the tissue, because it is possible to discriminate between the skin lesions at this indentation depth.

Advantageously, the determination of a force of resistance to the deformation of the tissue as a function of an indentation depth allows getting rid of the force of deformation of the tissue, and in particular when there is a significant variability between two types of tissue, especially between young skins, or aged skins. On the other hand, in the case where the measurement is performed by applying a given force, the tissue could be deformed in depth by about 10% for an aged skin, while it could be deformed in depth by about 50% for a young skin. Thus, the analysis of the tissue data would not have been the same. Consequently, and as described before, it is possible for an indentation depth of 100 μm to differentiate between a melanoma, a carcinoma, etc., regardless of the biomechanical characteristics of the tissue.

According to one embodiment, the measuring device comprises a lighting device configured to illuminate the area of interest when the image of the tissue is collected by the camera.

According to one embodiment, the measuring device comprises a converging lens and a polarizing lens.

According to one embodiment, the measuring device is supplied with electrical energy via a storage system comprising a battery.

According to one embodiment, the measuring device is supplied with electrical energy via a wired power supply.

According to one embodiment, the first portion and the third portion are disposed on the same side of the case.

The object of the present disclosure can also be achieved by implementing a computer-implemented method for analyzing tissue data relating to a tissue, the tissue data analysis method comprising the following steps:
- reception from a strain gauge of a measurement of a force of resistance to deformation;
- reception from a position sensor of a measurement of an indentation depth representative of a displacement of an indenter relative to an original position;
- association of a measurement of the indentation depth and a measurement of the force of resistance to deformation corresponding to the indentation depth.

The previously-described arrangements enable a user to receive mechanical data, such as for example the target value, and optical data, such as for example the image of the tissue on a user terminal so as to carry out a tissue lesion characterization. In particular, the characterization may correspond to an analysis of the tissue lesion of the zone of the tissue on which the measurement has been carried out.

The data analysis method may further have one or more of the following features, considered alone or in combination.

According to one embodiment, the tissue data analysis method comprises a step of determining a target value of the force of resistance to the deformation of the tissue corresponding to a predetermined indentation depth.

According to one embodiment, the tissue data analysis method comprises a step of receiving an image of the tissue originating from a camera.

According to one embodiment, the tissue data analysis method may comprise a step of transmitting the target value and the image of the tissue to a user terminal. In this manner, the analysis of the tissue data is facilitated by the image of the tissue which could help represent a possible tissue lesion. In other words, the tissue data analysis method allows imitating the act of an expert practitioner in a repetitive and reliable manner. Indeed, the step of determining a target value of the force of resistance to the deformation of the tissue corresponding to a predetermined indentation depth may correspond to palpation of the tissue by the expert practitioner, the step of receiving an image of the tissue originating from a camera may correspond to an observation of the surface of the tissue by the practitioner expert.

According to one embodiment, the tissue data analysis method comprises a step of verifying the charge level of a storage system in a measuring device of a type as those described before. In this manner, the measuring device can be powered up when the charge level of the storage system is higher than a threshold storage. Moreover, the measuring device can be placed in a standby state when it is not used for a given time.

According to one embodiment, the storage system comprises a battery.

According to one embodiment, the step of determining the target value is carried out for an indentation depth comprised between 90 μm and 110 μm, and in particular substantially equal to 100 μm.

According to one embodiment, the step of determining a target value of the force of resistance to the deformation of the tissue corresponding to a predetermined indentation depth is carried out in less than 1 s, and in particular in less than 0.5 s and more particularly in less than 0.1 s.

According to one embodiment, the tissue data analysis method comprises a step of receiving a measurement instruction originating from a user, the measurement instruction being intended to:
- trigger a measurement of the force of resistance to the deformation an indentation depth measurement when the indenter comes into contact with the tissue;
- trigger a collection of the image of the tissue when the camera is-disposed at the surface of the tissue.

According to one embodiment, the collection of the image of the tissue is carried out after a lighting time by a lighting device, for example LEDS. The lighting time may be comprised between 1 second and 5 seconds and more particularly substantially equal to 3 seconds.

According to one embodiment, the tissue data analysis method is implemented by a processor included in a measuring device of a type as those described above.

According to one embodiment, the computer comprises a data memory, the data analysis method comprising the following steps
- recording in a data memory of the deformation resistance force and the indentation depth received during the step of receiving the deformation resistance force and the step of receiving the indentation depth;
- determination of a set of values of force of resistance to the deformation of the tissue measured at indentation depths close to the predetermined indentation depth;
- validation of the target value of the force of resistance to the deformation of the tissue according to said set of values of force of resistance to the deformation of the tissue.

By "indentation depths close to the predetermined indentation value", it should be understood values of the force of resistance to the deformation of the tissue measured at an indentation depth included within an interval of 10 μm around the predetermined indentation depth.

In particular, the previously-described arrangements allow verifying that a measurement of the force of resistance to the deformation of the tissue at the predetermined indentation depth is consistent. Thus, the arrangements as described allow getting rid of measurement artefacts and handling errors by the user.

According to one embodiment, the tissue data analysis method comprises a step of transmitting an end of measurement signal to the user when the measured indentation depth is greater than a threshold value, the threshold value being strictly greater than the predetermined indentation depth.

According to one embodiment, the threshold value is equal to the value of the predetermined indentation depth plus 20 μm.

According to one embodiment, the tissue data analysis method may comprise the following steps implemented by the user terminal:
- reception of the image of the tissue and of the target value originating from the processor;
- transmission of the image of the tissue and of the target value to a database;
- reception of an assessment originating from the database;
- transmission of the assessment to the user.

The previously-described arrangements allow comparing the image of the tissue and the target value with data included in a local database or in a shared database, so as to refine the quality of the diagnosis.

According to one embodiment, the database may be a local database or a database on a cloud computing infrastructure platform.

Finally, the object of the present disclosure can be achieved by implementing a computer program product comprising code instructions arranged to implement the steps of a data analysis method of the type described hereinbefore, when said program is executed by a processor.

BRIEF DESCRIPTION OF THE DRAWINGS

Other aspects, aims, advantages and features of the invention will appear better upon reading the following detailed description of preferred embodiments thereof, given as a non-limiting example, and made with reference to the appended drawings wherein:

FIG. 1 is a schematic view of the measuring device according to one embodiment.

FIG. 2 is a schematic view of the first portion and of the second portion of the measuring device according to one embodiment.

FIG. 3 is a schematic view of the third portion of the measuring device according to one embodiment.

FIG. 4 is a schematic view of the measuring device according to another embodiment.

FIG. 5 is a schematic sectional view of the device of FIG. 4.

FIG. 6 is a schematic view of the position sensor of the device of FIGS. 4 and 5.

FIG. 7 is an example of a sequence illustrating an embodiment of the tissue data analysis method.

FIG. 8 is an example of a curve illustrating the association of a set of measurements of the force of resistance to the deformation of the tissue with a set of indentation depth measurements.

FIG. 9 is an example of two curves illustrating the association of a set of force measurements of the force of resistance to the deformation of the tissue with a set of indentation depth measurements.

FIG. 10 is a schematic view illustrating another embodiment of the tissue data analysis method.

DETAILED DESCRIPTION

In the figures and in the remainder of the description, the same references represent identical or similar elements. In addition, the various elements are not represented to scale so as to favor clarity of the figures. Moreover, the different embodiments and variants are not mutually exclusive and could be combined with one another.

A first embodiment of the present disclosure is illustrated in FIG. 1. It relates to a measuring device denoted "D" intended to be placed in contact with a tissue denoted "T". In general, the tissue T is a biological tissue T and more particularly a skin.

According to this embodiment, the measuring device D comprises a case 9 comprising a first portion 11, a second portion 13, a third portion 15 and a fourth portion 17.

The first portion 11 comprises a strain gauge 3 and a position sensor 5.

The second portion 13 has a support surface denoted "S", and intended to be positioned in contact with the tissue T.

The second portion 13 may be connected to the first portion 11 via at least one return element 21.

According to one embodiment, the return element 21 may comprise one or several spring(s).

The previously-described arrangements allow stabilizing the device on the tissue T before the measurement is taken by a user denoted "Usr".

The third portion 15 may comprise a camera 23 and a lighting system 35.

Finally, the fourth portion 17 may be secured to the second portion 13 on the one hand and to the third portion 15 on the other hand and configured to enable gripping of the measuring device D by one hand. In this manner, the fourth portion 17 could be used as a handle to manipulate the measuring device D.

The first portion 11 and the second portion 13 are illustrated in more details in FIG. 2, in two relative positions of the first portion 11 with respect to the second portion 13.

In particular, an indenter 1 bears on the first portion 11.

The indenter 1 may be configured to cause a deformation of the tissue T, and to be displaceable relative to the support surface S between an original position and an indentation position illustrated in FIG. 2B in which the tissue T is deformed by the indenter 1.

The strain gauge 3 may be configured to measure a resistance force of the tissue T to the deformation caused by the indenter 1, and the position sensor 5 may be configured to measure an indentation depth representative of a displacement of the indenter 1 between the original position and the indentation position.

The indenter 1 may comprise a distal end 7 having a shape adapted to enable a deformation of the tissue T substantially perpendicular to the surface of said tissue T opposite the support surface S.

By substantially perpendicular, it should be understood a direction comprised within an angular interval from 0° to 5° with respect to the normal direction of the tissue surface T.

According to one embodiment, the original position corresponds to the position of the indenter 1 when it comes into contact with the tissue T.

According to one embodiment, bringing the indenter 1 into contact with the tissue T is detected when the strain gauge 3 registers a stress value greater than a threshold value, for example 0.01 mN. In this manner, it is possible to detect the original position automatically by detecting a stress value. This original position could then serve as an origin point allowing performing a superposition between a theoretical control curve with a measured actual curve, which associates a set of measurements of the force of resistance to the deformation of the tissue with a set of indentation depth measurements. Thus, the greater the match between the measured curve and the control curve, the more reliable the result of the analysis will be.

According to one embodiment, the measurement of the force of resistance to the deformation of the tissue T is stopped mechanically when the distal end 7 of the indenter 1 exceeds an indentation depth of 100 μm. For example, the measurement of the force of resistance to the deformation of the tissue T may be stopped when the first portion 11 abuts against the second portion 13, or at the end of a predetermined measurement time, or again when the measurement has stabilized.

The strain gauge 3 may be configured to measure the force of resistance to the deformation of the tissue T according to a measurement axis. In this case, the indentation depth is measured according to the measurement axis, said measurement axis being substantially perpendicular to the support surface S.

By substantially perpendicular, it should be understood a direction of the measurement axis comprised within an angular interval from 0° to 5° with respect to the normal direction of the tissue surface T.

According to one embodiment, the strain gauge 3 has a nominal capacity of ±0.5 N. The electric power supply is done at a voltage of 5V.

In general, the strain gauge 3 may be configured to convert a force measurement into an output voltage related to the completed force measurement.

According to one embodiment, the strain gauge 3 is configured to measure a plurality of forces of resistance to the deformation of the tissue T at a point of interest included in an area of interest at the surface of the tissue T, according to the indentation depth.

According to one embodiment, the position sensor 5 comprises a linear position sensor.

According to one embodiment, the position sensor 5 comprises an inductive sensor.

According to one embodiment, the position sensor 5 may have a 4 µm step over a range of 2 mm.

The third portion 15 is illustrated in FIG. 3. In particular, it could define an opening 27 configured to delimit the area of interest representative of an area at the surface of the tissue T from which an image of the tissue T is collected.

According to one embodiment, the opening 27 is included in a dark chamber formed in the case 9, said dark chamber being configured to delimit a volume protected from external light in which the image of the tissue T is collected. In this manner, the collection of an image of the tissue T by a camera 23 is reproducible and standardized.

The third portion 15 may comprise the camera 23 configured to collect an image of the tissue T representative of the tissue T. The measuring device D could then be configured to communicate the image of the tissue T, the force of resistance to the deformation of the tissue T and the indentation depth to a user terminal 25.

According to one embodiment, the measuring device D comprises a lighting device 35 configured to illuminate the area of interest when the image of the tissue T is collected by the camera 23.

The measuring device D may also comprise a converging lens 37 and a polarizing lens 39.

The fourth portion 17 may comprise a processor 29 configured to communicate with the position sensor 5, the strain gauge 3 and the camera 23 via a converter element 31.

According to one embodiment, the processor 29 could communicate with the user terminal 25 via an antenna 33. Alternatively, the processor 29 could communicate with the user terminal 25 by wired connection.

According to one embodiment, the processor 29 comprises a microcontroller configured to monitor the position sensor 5 and the strain gauge 3 in real-time. According to one embodiment, the microcontroller, the position sensor 5 and the strain gauge 3 are contained in a volume smaller than 10,050 mm³. In this manner, the measurement signals measured by the strain gauge 3 and by the position sensor 5 are more stable, which allows guaranteeing a more reliable measurement. Moreover, the described arrangements allow limiting the overall bulk and providing a more ergonomic measuring device D.

According to one embodiment, the converter element 31 comprises an analog-to-digital converter. For example, said analog-to-digital converter may be configured to operate at 24 bits.

In general, the converter element 31 may be configured to convert an electrical voltage into a digital signal.

According to one embodiment, the converter element 31 is configured to convert a plurality of forces of resistance to the deformation of the tissue T into a first signal, and to convert a plurality of indentation depths into a second signal. The processor 29 is then configured to determine, from the first signal and the second signal, a target value of the force of resistance to the deformation of the tissue T corresponding to a predetermined indentation depth.

In this case, the processor 29 could be configured to communicate the target value, and the image of the tissue T to the user terminal 25.

Alternatively, the target value and the image of the tissue could be analyzed according to an algorithm in order to characterize a tissue lesion.

In particular, the analysis may be carried out by an artificial intelligence processing using an engine trained with test data corresponding to known cases. It is also possible to use a decision tree.

According to one embodiment, the predetermined indentation depth is comprised between 90 µm and 110 µm and more particularly substantially equal to 100 µm. The previously-described arrangements allow differentiating different types of skin lesions. For this measurement to be reliable, it is in particular essential to be able to guarantee that the measuring device D establishes a measurement at 100 µm of indentation counted from the contact of the tissue T, because it is possible to differentiate the skin lesions at this indentation depth.

Advantageously, the determination of a force of resistance to the deformation of the tissue as a function of an indentation depth allows overcoming the deformation force of the tissue T, and in particular when there is a significant variability between two types of tissue T, in particular between young skins, or aged skins. On the other hand, in the case where the measurement is performed by applying a given force, the tissue T could be deformed in depth by about 10% for an aged skin, while it could be deformed in depth by about 50% for a young skin. Thus, the analysis of tissue data would not have been the same. Consequently, and as previously described, it is possible for an indentation depth of 100 µm to differentiate between a melanoma, a carcinoma, etc., regardless of the biomechanical characteristics of the tissue T.

The previously-described arrangements allow measuring the biological characteristics of the tissue T and in particular the rigidity of the tissue T and an image of the tissue T which could characterize at least one tissue lesion if it is present at the level of the measurement area.

Another embodiment of the measuring device D is represented in FIGS. 4 to 6. According to this embodiment, and as represented in FIG. 4A, the first portion 11, and the third portion are disposed on the same side of the case 9. Thus, the support surface S comprises the opening 27 of the third portion 15, as illustrated in FIG. 4B (bottom view), and 4C (side view).

Thus, the indenter 1, the position sensor 5 and the strain gauge 3 are disposed on the same side of the case 9.

In this manner, the collection of an image of the tissue T by the camera 23 can be carried out simultaneously with a measurement of a force of resistance to the deformation of the tissue by the strain gauge 3. In other words, it is not necessary to operate a rotation of the housing 9 to carry out the measurement of a force of resistance to the deformation of the tissue by the strain gauge 3 and the collection of an image of the tissue T by the camera 23.

According to the embodiment represented in FIGS. 4 to 6, the at least one return element 21 consists of a spring included on the position sensor 5. Hence, said position sensor 5 can bear on the first portion 11 (FIGS. 5A and 6B) during the measurement. Moreover, the return element 21 allows returning to a rest position when the measuring device D is not performing a measurement (FIGS. 5B and 6A).

As illustrated in FIG. 7, an embodiment of the present disclosure also relates to a method for analyzing tissue data relating to a tissue T, the method being implemented by computer and for example a processor 29 configured to communicate with a camera 23, a strain gauge 3, and a position sensor 5 via a converter element 31, the processor 29 could be supplied with electrical energy by a storage system 41. According to an alternative variant, the processor 29 of the measuring device D could be supplied with electrical energy via a wired power supply.

In particular, the storage system 41 may comprise a battery.

According to one embodiment, the data analysis method may comprise a step V1 of verifying the charge level of the storage system 41.

In this manner, the measuring device D can be powered up when the charge level of the storage system 41 is higher than a threshold storage. Moreover, the measuring device D can be placed in a standby state when it is not used for a given time.

According to one variant, the data analysis method may comprise a step R7 of receiving a measurement instruction from a user Usr, the measurement instruction being intended to
  trigger a measurement M1 of the force of resistance to the deformation following the transmission T9 of a first measurement instruction intended for the strain gauge 3, and to trigger an indentation depth measurement M3 when an indenter 1 of the type of the former one comes into contact with the tissue T, following the transmission T11 of a second measurement instruction intended for the position sensor 5;
  trigger a collection M5 of the image of the tissue T when the camera 23 is disposed at the surface of the tissue T, following the transmission T13 of a third measurement instruction intended for the camera 23.

According to one embodiment, the collection M5 of the image of the tissue T is carried out at the end of a lighting time by a lighting device 35, for example LEDS. The lighting time may be comprised between 1 second and 5 seconds and more particularly substantially equal to 3 seconds.

In particular, the tissue data analysis method comprises the following steps:
  reception R1 from the strain gauge 3 of a deformation resistance force measurement;
  reception R3 from the position sensor 5 of an indentation depth measurement representative of a displacement of an indenter 1 with respect to an original position;
  association A1 of a measurement of the indentation depth and of a deformation resistance force measurement corresponding to the indentation depth;
  reception R5 from the camera 23 of an image of the tissue T;
  determination D1 of a target value of the force of resistance to the deformation of the tissue T corresponding to a predetermined indentation depth.

According to one embodiment, the target value is determined for an indentation depth comprised between 90 μm and 110 μm, and in particular substantially equal to 100 μm.

According to one embodiment, the processor 29 may be adapted to communicate with a user terminal 25 via an antenna 33, the method may then include a step T1 of transmitting the target value and the image of the tissue to a user terminal 25 via the antenna 33. According to another non-limiting variant, the processor 29 may be adapted to communicate with a user terminal 25 via a wired connection.

The previously-described arrangements enable the user Usr to receive mechanical data, such as for example the target value, and optical data, such as for example the image of the tissue T on a user terminal 25 so as to carry out a diagnosis. In particular, the diagnosis may correspond to an analysis of a tissue lesion of the area of the tissue T on which the measurement has been carried out.

In other words, the tissue data analysis method allows imitating the act of an expert practitioner in a repetitive and reliable manner. Indeed, step D1 of determining a target value of the force of resistance to the deformation of the tissue corresponding to a predetermined indentation depth may correspond to a palpation of the tissue by the expert practitioner, step R5 of receiving an image of the tissue originating from a camera may correspond to an observation of the surface of the tissue by the expert practitioner.

According to a particular embodiment for which the processor 29 comprises a data memory 43, the data analysis method may also comprise the following steps:
  recording S1 in the data memory 43 the force of resistance to deformation and the indentation depth received during the deformation resistance force reception step R1 and the indentation depth reception step R3;
  determination D3 of a set of values of force of resistance to the deformation of the tissue T measured at indentation depths close to the predetermined indentation value;
  validation V2 of the target value of force of resistance to the deformation of the tissue T according to said set of values of force of resistance to the deformation of the tissue T.

By "indentation depths close to the predetermined indentation value", it should be understood values of force of resistance to the deformation of the tissue T measured at an indentation depth comprised within an interval of 10 μm around the predetermined indentation depth.

FIGS. 8 and 9 illustrate embodiments for which each measurement of a set of measurements of the force of resistance to the deformation of the tissue T is associated with a measurement of the indentation depth of a set of measurements of the indentation depth. In particular, FIG. 8 illustrates the indentation depths close to the predetermined indentation value and the corresponding forces Fmax and Fmin. In particular, FIG. 9A illustrates how it is possible to differentiate between different types of melanoma by implementing the measuring device D according to the present disclosure. This FIG. 9A is a graphical representation of the rigidities measured by the implementation of the measuring device D according to different lesions (invasive melanoma or non-invasive melanoma) and of a healthy skin (melanocyte). FIG. 9B shows the rigidity results measured by implementing the measuring device D according to a standardized matrix with an increasing rigidity (0.2% to 4%).

In particular, the previously-described arrangements allow verifying that a measurement of the force of resistance to the deformation of the tissue T at the predetermined indentation depth is consistent. Thus, the arrangements as described allow getting rid of measurement artefacts and handling errors by the user Usr.

Finally, the tissue data analysis method may comprise a step T3 of transmitting an end of measurement signal intended for the user Usr when the measured indentation depth is greater than a threshold value, the threshold value being strictly greater than the predetermined indentation depth.

According to one embodiment, the threshold value is equal to the value of the predetermined indentation depth plus 20 μm.

According to an embodiment illustrated in FIG. 10, the tissue data analysis method may comprise the following steps implemented by the user terminal 25:
- reception R9 of the image of the tissue T and of the target value originating from the processor 29;
- transmission T5 of the image of the tissue T and of the target value to a database 45, 47;
- reception R11 of an assessment originating from the database 45, 47;
- transmission T7 of the assessment to the user Usr.

The previously-described arrangements allow comparing the image of the tissue T and the target value with data included in a local database 45 or in a shared database 47, so as to refine the quality of the diagnosis.

Finally, the present disclosure relates to a computer program product comprising code instructions arranged to implement the steps of a data analysis method of the type described before, when said program is executed by a processor 29.

The invention claimed is:

1. A measuring device intended to be placed in contact with a tissue, the measuring device comprising:
   a support surface intended to be positioned in contact with the tissue;
   an indenter configured to cause a deformation of the tissue, the indenter being configured to be displaceable relative to the support surface between an original position and an indentation position in which the tissue is deformed by the indenter;
   a strain gauge configured to measure a force of resistance of the tissue to the deformation caused by the indenter;
   a position sensor configured to measure an indentation depth representative of a displacement of the indenter between the original position and the indentation position; and
   a case comprising:
   a first portion on which the indenter bears; and
   a second portion including the support surface and being connected to the first portion via at least one return element.

2. The measuring device according to claim 1, wherein the original position corresponds to a position of the indenter when it comes into contact with the tissue.

3. The measuring device according to claim 2, wherein the strain gauge is configured to measure the force of resistance to deformation of the tissue according to a measuring axis, and wherein the indentation depth is measured according to the measurement axis, the measurement axis being substantially perpendicular to the support surface.

4. The measuring device according to claim 1, wherein the strain gauge is configured to measure the force of resistance to deformation of the tissue according to a measuring axis, and wherein the indentation depth is measured according to the measurement axis, the measurement axis being substantially perpendicular to the support surface.

5. The measuring device according to claim 1, comprising a camera configured to collect an image of the tissue representative of the tissue, the measuring device being configured to communicate the image of the tissue, the force of resistance to the deformation of the tissue and the indentation depth to a user terminal, and wherein the case comprises a third portion defining an opening, the opening being configured to delimit an area of interest representative of an area at the surface of the tissue from which the image of the tissue is collected.

6. The measuring device according to claim 5, wherein the strain gauge is configured to measure a plurality of forces of resistance to the deformation of the tissue at a point of interest included in the area of interest, depending on the indentation depth.

7. The measuring device according to claim 5, wherein the case comprises a fourth portion secured to the second portion on the one hand and to the third portion on the other hand and configured to enable gripping of the measuring device by one hand.

8. The measuring device according to claim 5, comprising a processor configured to communicate with the position sensor, and the strain gauge via a converter element on the one hand and to communicate with the user terminal via an antenna on the other hand, the converter element being configured to convert a plurality of forces of resistance to the deformations of the tissue into a first signal, and to convert a plurality of indentation depths into a second signal, the processor being configured to determine, from the first signal and the second signal, a target value of the force of resistance to deformation of the tissue corresponding to a predetermined indentation depth.

9. The measuring device according to claim 8, wherein the processor is configured to communicate the target value, and the image of the tissue to the user terminal.

10. The measuring device according to claim 8, wherein the predetermined indentation depth is comprised between 90 μm and 110 μm.

11. The measuring device according to claim 10, wherein the predetermined indentation depth is 110 μm.

12. A tissue data analysis method implemented by a computer for analyzing tissue data relating to a tissue, the tissue data analysis method comprising the following steps:
   reception from a strain gauge of a measuring device a measurement of a force of resistance to deformation;
   reception from a position sensor of a measurement of an indentation depth representative of a displacement of an indenter relative to an original position; and
   association of a measurement of the indentation depth and a measurement of the force of resistance to deformation corresponding to the indentation depth, wherein the measuring device includes a support surface intended to be positioned in contact with the tissue and a case comprising: a first portion on which the indenter bears; and a second portion including the support surface and being connected to the first portion via at least one return element.

13. The tissue data analysis method according to claim 12, comprising a step of determining a target value of the force of resistance to deformation of the tissue corresponding to a predetermined indentation depth.

14. The tissue data analysis method according to claim 13, wherein the step of determining the target value is carried out for a predetermined indentation depth comprised between 90 μm and 110 μm.

15. The tissue data analysis method according to claim 14, wherein the step of determining the target value is carried out for a predetermined indentation depth of 110 μm.

16. The tissue data analysis method according to claim 13, comprising the following steps:
- recording in a data memory of the force of resistance to deformation and the indentation depth received during the step of receiving the deformation resistance force and the step of receiving the indentation depth;
- determination of a set of values of force of resistance to the deformation of the tissue measured at indentation depths close to the predetermined indentation depth; and
- validation of the target value of the force of resistance to the deformation of the tissue according to the set of values of force of resistance to the deformation of the tissue.

17. A measuring device intended to be placed in contact with a tissue, the measuring device comprising:
- a support surface intended to be positioned in contact with the tissue;
- an indenter configured to cause a deformation of the tissue, the indenter being configured to be displaceable relative to the support surface between an original position and an indentation position in which the tissue is deformed by the indenter;
- a strain gauge configured to measure a force of resistance of the tissue to the deformation caused by the indenter;
- a position sensor configured to measure an indentation depth representative of a displacement of the indenter between the original position and the indentation position, wherein the original position corresponds to a position of the indenter when it comes into contact with the tissue, wherein the strain gauge is configured to measure the force of resistance to deformation of the tissue according to a measuring axis, and wherein the indentation depth is measured according to the measurement axis, the measurement axis being substantially perpendicular to the support surface;
- a case comprising:
  - a first portion on which the indenter bears; and
  - a second portion including the support surface and being connected to the first portion via at least one return element.

18. The measuring device according to claim 17, comprising a camera configured to collect an image of the tissue representative of the tissue, the measuring device being configured to communicate the image of the tissue, the force of resistance to the deformation of the tissue and the indentation depth to a user terminal.

* * * * *